July 14, 1959     O. C. STAHL     2,894,483
APPARATUS FOR COATING HOSE
Original Filed May 31, 1955     2 Sheets-Sheet 1
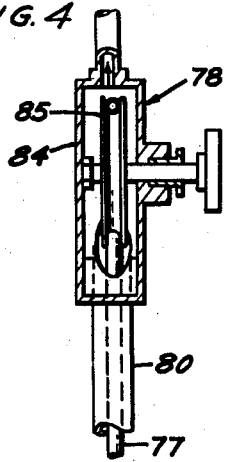
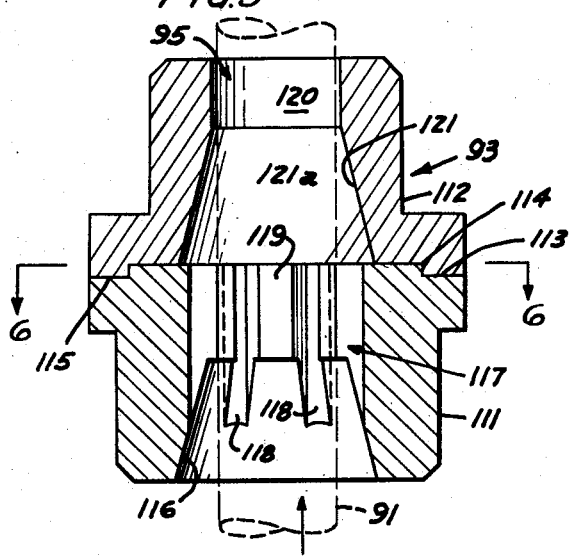
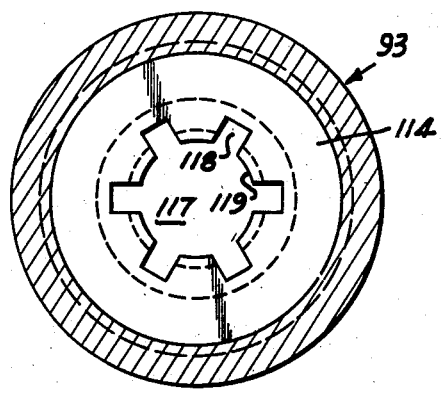
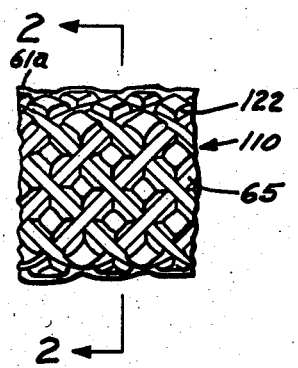
INVENTOR.
OSCAR C. STAHL
BY D. Gordon Angus
ATTORNEY.

July 14, 1959     O. C. STAHL     2,894,483
APPARATUS FOR COATING HOSE
Original Filed May 31, 1955     2 Sheets-Sheet 2
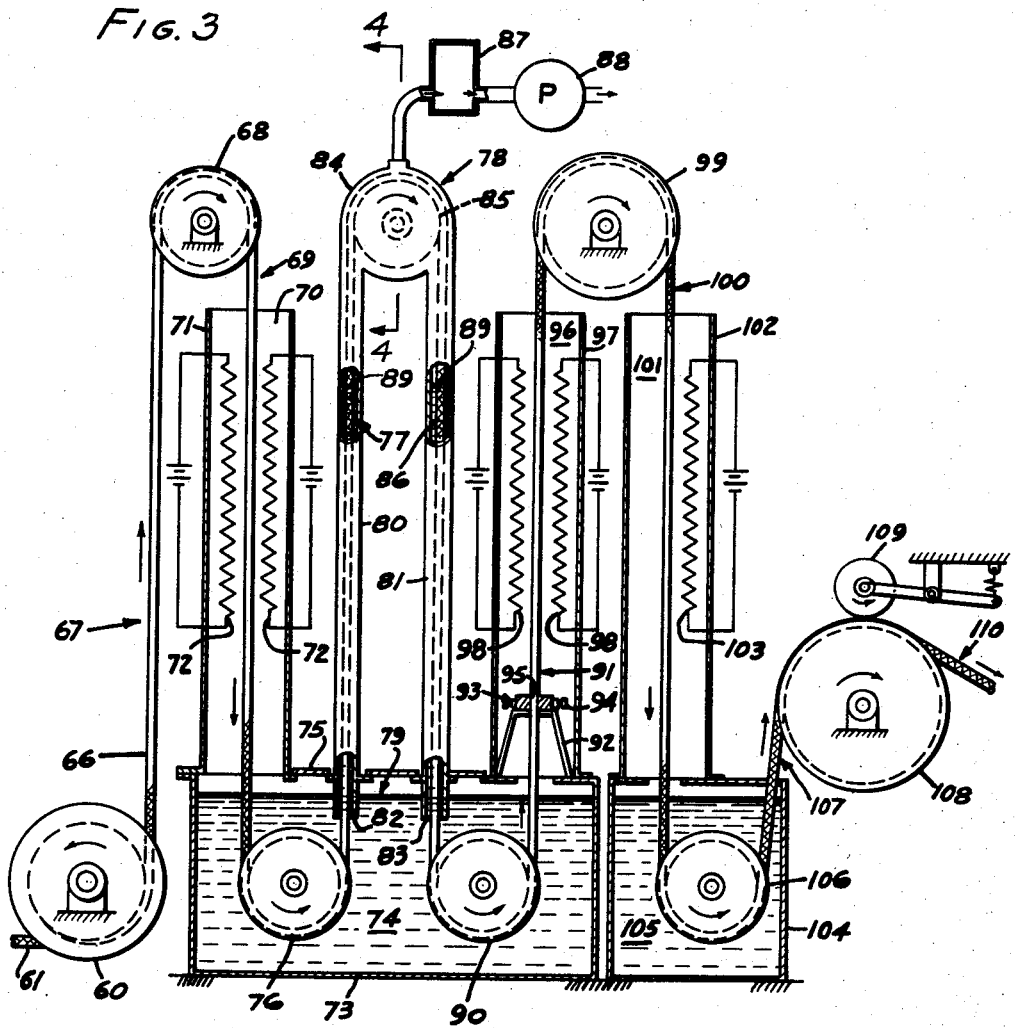
INVENTOR.
OSCAR C. STAHL
BY
D. Gordon Angus
ATTORNEY.

United States Patent Office 2,894,483
Patented July 14, 1959

2,894,483

APPARATUS FOR COATING HOSE

Oscar C. Stahl, Los Angeles, Calif., assignor, by mesne assignments, to The Borden Company, New York, N.Y., a corporation of New Jersey Original application May 31, 1955, Serial No. 511,849, now Patent No. 2,763,316, dated September 18, 1956. Divided and this application August 16, 1956, Serial No. 604,380

5 Claims. (Cl. 118—50)

This invention relates to an apparatus for coating reinforced hose.

This application is a division of my co-pending Oscar C. Stahl application, Serial No. 511,849, filed May 31, 1955, entitled: "Hose, and Method and Apparatus for Manufacturing the Same," now Patent No. 2,763,316. Said co-pending application of which this is a division, is a continuation in part of Oscar C. Stahl application Serial No. 459,916 filed October 6, 1954, for "Method for Making Reinforced Resin Hose," now abandoned.

A two ply hose having an inner core and an outer layer as plies is described in Davis Patent 2,645,349. Such a hose is conveniently made of a resin compounded with a plasticizer and other additives. An advantage of such a hose is that the plies, while being fused together to form an integral hose, can still be individually formulated so that each ply can have the specific properties which are most suitable for the service conditions to which it is primarily subjected. For instance, the material for the inner core can be formulated to provide for maximum bursting strength and water resistance, while the material of the outer layer can be formulated to provide for best abrasion resistance and light stability.

It is sometimes desirable to provide additional mechanical reinforcement in resin hoses of this type, and some attempts have been made to place a braid between the core and the outer layer for this purpose. However, such a braid as heretofore placed between plies occasionally shows a tendency to break free and shift its position and thus tends to cut the outer layer from the inner core when the two should remain fused together. This tendency is most noticeable near the fittings at the end of the hose where the reinforcement is most needed. As a consequence of this braid shift, the hose will be considerably weakened.

In the manufacture of multiple layer hose, particularly of hose which is made of materials such as polyvinyl chloride and the like, which is commonly known as "plastic hose," considerable trouble is encountered by reason of air which becomes entrapped in the materials of construction. This entrapped air forms bubbles in the plastic material during the curing process and often results in an unnecessarily high rate of scrap production.

The problem of entrapped air is particularly serious in the manufacture of a multi-layer hose wherein a braid is placed between contiguous layers of a multiple layer hose. In one process for making such a hose, a braid is laid on the surface of an inner layer or core, and the next outer layer is applied by coating the braid-covered core with a liquid plastisol. The thickness of this outer layer is determined by wiping off excess plastisol, and then the hose is cured by means such as infrared radiation or a hot air blast. Fibrous braids have large surface areas and many interstitial spaces which entrap or absorb gas molecules, and this gas, when released by the heat of the curing operation causes bubbles or holes in the outer plastisol layer. The outer layer is thereby rendered pocked and unsightly, and the hose must be rejected.

In addition it has been found that air in the hose braid prevents the braid from making a satisfactory joinder with the plies of resin. For a durable bond and a sound hose, the resin of both layers should coalesce with the outer surface of the braid and with each other, and any air present will bar the resin from making a sufficiently intimate contact with the braid to achieve such coalescence.

This invention may advantageously be carried out by use of apparatus similar to that shown in the Stahl Patent 2,626,426 wherein a plastic inner core or hose ply is extruded to form the central part of the hose, and wherein means are provided for coating the outer surface of this inner core to form the outer layer or hose ply.

It is an object of this invention to provide apparatus for making plastic hose which diminishes, and usually prevents, air from spoiling the hose.

An additional object is to provide for the manufacture of braid reinforced plastic hose wherein the air can be removed from the braid so that the outer layers are not spoiled, and so that the braids and its adjacent hose layers can all be mutually and firmly bonded together.

An optional object of this invention is to provide for the manufacture of a multiple-layer hose having a treaded outer surface for minimizing abrasive damage when the hose is dragged along a surface.

According to one feature of the invention, a hose core which forms a layer of the multiple layer hose is passed through a vacuum chamber to remove the air from surfaces thereof. A plastisol covering for this core may be applied to the core so as to form the outer layer either before or after the core is passed through the vacuum chamber. The hose is thereafter passed through a wiper die to define the dimensions of the outer layer, and then the hose is cured to make it a flexible solid structure.

According to a preferred but optional feature of the invention, an inner hose core has a braid applied thereto, and the braid-covered core is then immersed in liquid plastisol, some of which adheres to the core. The inner core with its braid and adherent plastisol is next passed through a vacuum chamber so as to de-air the core, braid, and plastisol. Thereafter, the hose is passed through a wiper die and a curing device so as to define the outer diameter and to cure the hose.

A preferred but optional means for exposing the hose to a vacuum resides in a U-shaped conduit having its two legs immersed in the plastisol reservoir. A vacuum is created at the bight of the U. Preferably, although not necessarily, the legs are sufficiently long that the vacuum does not pull the plastisol up into the bight of the U. There will then be an extended region of subatmospheric pressure through which the core passes for the removal of air from its surface, from the braid, and from the outer plastisol covering.

Another optional feature of the invention resides in heating the hose after application of the braid so that the inner core is caused to protrude between the strands of braid to create a treaded surface on the outside of the hose.

Another optional feature of this invention resides in plaiting a braid onto the outer surface of the inner core, and wetting the braid with a plasticizer prior to the application of the outer layer. After the braid has been laid on the inner core and wetted, the outer layer is applied so as to cover both, and the resulting two-ply reinforced structure is thereafter cured according to conventional practice to form a plastic resinous structure.

Another optional feature allied to the feature next above resides in heating the plasticizer, and thereby the braid and inner core so as to aid in further deairing of the materials. Heat may also be applied to the plasticizer-coated braid-covered inner core for this purpose before the application of material for the outer layer.

Still another optional feature of the invention resides in a wiper die having a wiper orifice for determining the quantity of plastisol which is to be left on the braid-covered core, and a reservoir immediately adjacent said wiper orifice which contains plastisol for assuring a constant supply of plastisol at said orifice. This wiper die enables a hose to be manufactured having an outer layer of fairly uniform thickness, and which conforms to and maintains the surface configuration of the inner layer, even when said surface configuration is irregular.

The above and other features of this invention will be fully understood from the following detailed description and the accompanying drawings, of which:

Fig. 1 is a side view of a piece of hose which can be produced by the methods of this invention;

Fig. 2 is a cross-section taken at line 2—2 of Fig. 1;

Fig. 3 is a side elevation, partly in cutaway cross-section, of a hose manufacturing apparatus according to the invention;

Fig. 4 is a fragmentary view, partly in cross-section, taken at line 4—4 of Fig. 3;

Fig. 5 is a cross-sectional elevation of the wiper die shown in Fig. 3; and

Fig. 6 is a cross-section taken at line 6—6 of Fig. 5.

In the apparatus of Fig. 3, a supply reel 60 acts as a source of a cylindrical tubing 61 of indefinite length, which tubing comprises the inner core, or layer, of a multilayer hose which is to be manufactured by the apparatus of Fig. 3. Such an inner core 61 is conveniently extruded from a conventional screw type pressure extruder. As is well known in the art, cross-sections of many configurations can be obtained by the use of such cross-heads. This disclosure will relate to the manufacture of a hose using a smooth cylindrical inner core. However, it will be understood that other cross-sections of tubing could also be utilized.

The inner core passes through a conventional braiding device where any desired braid pattern, such as the diamond shaped pattern shown in Fig. 1, can be created. For purposes of this disclosure, a diamond-shaped braid pattern will be discussed throughout, it being understood that other braid patterns are also attainable, and also that a woven hose is contemplated as well as a braided hose. The term "braided" is used herein to denote a pattern of crossed strands, regardless of the orientation of said strands.

After the inner core has had the braid applied thereto, it may either be run upon a supply reel 60 in convenient lengths, say of 1000 feet, or may simply be deflected over these supply reels, using the reel as a pulley, and passed directly into the apparatus of Fig. 3 as shown.

Therefore, it will be understood that the extruder forms no part of the invention, since the invention in any of its forms may be practiced by utilizing inner cores which may or may not be manufactured concurrently with the operation of the coating and de-airing apparatus. In fact, an advantage of this invention is that the braid-covered inner core can be stored in convenient lengths on reels and does not acquire a permanent set. This permits hose making machinery to be operated semi-automatically, instead of continuously, with a considerable saving in plant overhead.

The braid covered inner core 66 passes from the supply reel 60 in an upwardly bound arm 67 to a first driven pulley 68 which directs the braid covered core into a downwardly directed arm 69.

The downwardly directed arm 69 passes through a pre-heat chamber 70 inside a cylindrical jacket 71. Any convenient heating means may be provided in this pre-heat chamber, electrically operated infrared heaters 72 being an illustrative and preferred example. The temperatures to be utilized in this pre-heat chamber, and the results effected thereby will be further discussed below.

From the pre-heat chamber, the downwardly bound arm 69 passes into a reservoir 73 which is filled with a plastisol 74 which may be one of the compounds described in my previously identified U.S. Patent 2,763,316. Removable covers 75 may be provided over the open portions of the reservoir so as to exclude dust therefrom. The downwardly bound arm 69 is led over a submerged driven pulley 76 which is journaled to the side of the reservoir, and this pulley wheel 76 directs the inner core, which is now covered with plastisol due to its immersion in the reservoir, into an upwardly bound arm 77.

The upwardly bound arm 77 enters a vacuum apparatus 78, the entrance and exit of which are disposed beneath the surface 79 of the plastisol in the reservoir. This vacuum apparatus comprises a generally U shaped structure having two legs 80 and 81 which have open lower ends 82 and 83, respectively, which are disposed below the surface of the plastisol. These tubular legs are tightly fitted to a closed cylindrical drum 84 (the "bight" of the U). The legs, the drum, and all joints are hermetically sealed against leakage.

A driven pulley 85 is fitted inside the drum over which the upwardly directed arm 77 passes to be deflected down again as downwardly directed arm 86. A vacuum accumulator 87 is connected to the drum, and a vacuum pump 88 maintains a vacuum within the accumulator and drum. The maintenance of the vacuum in the drum will draw plastisol from the reservoir 73 up into the legs 80 and 81 to a level on each leg indicated by the numeral 89. The height of this level 89 above the reservoir level is, of course, dependent upon the specific gravity of the plastisol and also upon the degree of vacuum maintained within the drum 84. Preferably, although not necessarily, the legs 80 and 81 are made sufficiently long that a high degree of vacuum can be maintained in the drum without pulling the level 89 up into the bight of the U, i.e. into the drum itself. By this means, a continuous region of progressively diminishing pressure is created above the level 79 of the plastisol in reservoir 73, within legs 80 and 81, and within the drum.

The hose leaves the vacuum device 78 at the bottom end 83 of leg 81, and proceeds around submerged driven pulley 90 to upwardly bound leg 91. As the plastisol-covered inner core leaves the pulley 90 it is completely covered with plastisol, and the air will have been removed from the surface of the inner core, from the braid, and from the plastisol which is closest to the braid and the inner core. Air in the small amount of plastisol picked up at pulley 90, and not later removed by the wiper die, has not been found to be troublesome.

Upwardly bound leg 91 passes through the center of a table 92 upon the top of which is disposed a wiper die 93 to be described in further detail below. This die is shiftably held to the table by means of adjustable clamps 94 so that the die can be adjusted so as to be centered on the upwardly bound arm 91 of the hose. The wiper die 93 has a central orifice 95 which serves to wipe off plastisol from the surface of the braid covered inner core in excess of that needed for an outer layer of the desired thickness. The correctly dimensioned hose then proceeds upwardly into a curing chamber 96. This curing chamber conveniently comprises a tubular jacket 97 within which are disposed heating elements 98 which may be such as infrared heaters if desired.

The upwardly bound arm 91 passes from the curing chamber 96 over a drive pulley 99, which deflects the hose into a downwardly bound arm 100, and into and through another curing chamber 101 which comprises a jacket 102 and heaters 103.

After leaving the curing chamber 101 the hose passes downwardly into a reservoir 104 which is filled with water 105 for cooling the hose core. A driven pulley 106, journaled in the wall of the reservoir 104, directs the hose in upwardly bound arm 107 toward a driven pulley 108 to which it is frictionally held by a spring loaded idler pulley 109. Thereafter, the completed hose 110 is directed to any desired storage means.

Figs. 1 and 2 show a multi-ply hose product which results from the apparatus of Fig. 3. As will be noted from the drawing, the inner core 61 and the outer layer 61a are fused and coalesced with each other and form a substantially homogenous, integral two-ply hose in which the braid is held firmly between the inner core and outer layer. A certain amount of the resin may be expected to permeate at least the outer pores of the braid, although there is no convenient means for illustrating this feature in the drawing.

In Figs. 5 and 6 there is shown a construction for a wiper die 93 which is well-suited for the manufacture of hose of an irregular surface contour. As an illustration of one such irregular surface contour, the diamond-treaded hose 110 which is produced according to the process of the invention is shown in Figs. 1 and 2.

This wiper die 93 is conveniently provided in two parts: an initial section 111 and a final section 112. These two sections are joined at a parting line 113 by means of a boss 114 on the initial section and an annular shoulder 115 on the final section, which surrounds and fits to the boss.

With specific reference to the initial section 111, there is provided a frusto-conical sloped chamber 116, which tapers toward a throat 117. The throat 117 has axial slots 118 cut in its walls so as to leave lands 119 therebetween. The diameter of the throat as defined by the inner surface of the lands is slightly larger than the outer diameter of the inner core plus the braid thickness. This throat thereby aligns the hose in the wiper die with greater accuracy than is attainable by simply aligning the upper and lower pulleys 90 and 99. The slots 118 permit an excess of plastisol to be carried along on the surface of the hose, and should be of such depth that the plastisol which is pulled through them by the hose is in excess of that needed to form the desired outer layer, when added to the plastisol which passes inside the lands 119.

The final section 112 of the wiper die has an orifice 120 at the top thereof with a diameter of such a size that it removes all but just sufficient plastisol on the hose to constitute an outer layer of the desired thickness. During the curing operation, the plastisol flows to create a jacket of substantially uniform thickness over the entire surface of the hose, and which maintains the surface configuration of the inner core.

To enable plastisol to be distributed evenly over the surface of the inner core, a counterbore 121 is provided below orifice 120 which tapers into and joins with said orifice 120. Thus throat 117 and orifice 120 comprise central orifice 95. It will be observed that when the initial and final sections of the wiper die are joined, a reservoir 121a is formed within the counterbore 121, between the throat and the orifice 120. Plastisol carried by the hose through the slots 118 fills the reservoir 121a, and this reservoir assures a steady supply of plastisol at the wiper die orifice 120 to form the hose surface. In this manner, the wiper die as shown is capable of providing the correct amount of plastisol to the surface of the hose for creating the desired outer jacket. Furthermore, the provision of the reservoir directly adjacent orifice 120 permits hose of irregular contour to receive a coating of uniform thickness. The reasons for this performance are not presently completely understood, but the improvement in hose manufactured utilizing a wiper die with such a reservoir over hose manufactured using a simple orifice ring without a reservoir is marked, particularly when a hose with an irregular surface is made. The braid alone makes a sufficiently irregular hose surface that the use of such a reservoir is advantageous.

The wiper die of Figs. 5 and 6 is shown as having six slots 118. It will be appreciated that more or fewer of these slots can be provided. However, six slots have been found to make an optimum die for carrying out this hose manufacturing operation.

In order to produce the most useful hose, the inner core and the outer layer will preferably be separately formulated so that each will posses specific properties most suitable to the service conditions each will encounter. For example, the inner core will often preferably have a high burst strength and water resistance, while the outer layer will often be formulated for sun resistance and abrasion resistance.

When commonly utilized braid materials are used, the braid material 65 on the inner core does not expand appreciably when the inner core is heated. However, the inner core does expand with heat, so that the inner core expands between the webs of the braid to form raised diamond shaped lands 122 on the surface of the hose. This effect can be augmented by utilizing braid materials which shrink during the curing process.

Depending on the constituents of the plastisol used to form the outer layer, the inner core and braid may be rendered visible by making the outer layer of transparent material. Alternately, the outer layer may be made opaque, so that the only hose design simply comprises the treaded surface of the outer layer.

For the manufacture of a hose having an inner core of an inner diameter of .500 inch, an outer diameter of .700 inch, and a maximum wall thickness of .100 inch, a nylon yarn thickness (as laid) of .005 inch, and an outer layer .005 thick, it has been found advantageous to operate the apparatus of Fig. 3 at a rate of from 20–23 feet of hose per minute. The pre-heat chamber 70 provides preferably approximately 10 feet of length in which the hose is exposed to heat, and the curing chambers will preferably total approximately 28 feet of curing length. Therefore, the residence time of an individual portion of the hose will be approximately 25 seconds in the pre-heat chamber, and approximately one and one half minutes in the curing chambers.

The pre-heat chamber in Fig. 3 will be maintained at approximately 100° F., which is sufficient to drive moisture and adsorbed gases from the surface of the inner core, and air out of the interstices of the braid, without causing the inner core to stretch excessively. Excessive stretching occurs if the core is heated much higher than 100° F. in the pre-heat chamber.

The curing chambers in Fig. 3 are preferably maintained at 350°–375° F., at which temperatures the outer layer of plastisol will be cured, and certain structural changes will occur in the inner core, which will be further described below.

Pump 88 in Fig. 3 will be operated to maintain a low vacuum, which will preferably be as low as or lower than one of two inches of mercury. When plastisol having a specific gravity of approximately 1.2 is used, it will be drawn up perhaps ⅔ of the height of the legs 80 and 81, leaving a region within the drum and at the top of the legs which is substantially evacuated, into which the air drawn from the braid, inner core, and plastisol can be discharged. Legs 80 and 81 may conveniently be approximately 12 feet long.

When an inner core without a braid on its surface is exposed to the temperatures used in this process, it will be found that it shrinks approximately 1½ inch per 12 inches of length. The outer diameter increases slightly, and the wall thickness of the tube also increases. If a non-shrinking braid such as a glass fiber braid is applied to the surface of the inner core, it will be found that when the hose is cured, the outer diameter of the hose does not materially increase, although there is a small protrusion of the inner core through the web of the braid. The tube will shorten somewhat, and the wall thickness will increase.

When a braid substance is used, such as nylon yarn, which shrinks during the curing process, the braid itself shrinks into the surface of the inner core when the hose is cured, and this augments the protrusion of the inner core through the braid so to create the raised lands 122 by a combination both of the shrinking of the nylon yarn, and also of the normal small amount of expansion of the tube. Nylon yarn shrinks by approximately 2 inches per 12 inches of length in the curing process. Therefore, in curing, the wall thickness of the tube increases, and the length of the inner core diminishes. It has been found that the inner core with nylon yarn contracts approximately 1½ inches per 12 inches of its length, while raised lands 122 are created.

Therefore, although by appropriately heating a hose with a braid on the surface, the diamond treaded configuration as shown in Figs. 1 and 2 will result even with a non-shrinking braid, the effect is augmented when a braid material is used which shrinks during the curing process.

Although the vacuum may be exerted at various locations in the system, it has been found preferable to remove the air in two stages, first by heating in the pre-heat chamber, and second by vacuum within the vacuum device 78 as shown in Fig. 3. It appears that de-airing the plastisol directly adjacent the inner core by means of the device 78, gives most advantageous results, and improved product.

The process as illustrated in Fig. 3 removes air from the inner core, the braid, and the plastisol close to the braid. It has been found that the vacuum device 78 alone is sufficient for this purpose, but that the preheating improves the product noticeably. While plastisol picked up in the reservoir while the hose passes around pulley 90 will have some air, it will be appreciated that this additional plastisol is most apt to be removed from the hose by the wiper die. Furthermore, the heat from the curing operation will drive off air close to the surface of the hose while the plastisol is still sufficiently fluid to flow over and cover any blemish which might result from the expulsion of a bubble of air close to the hose surface. The primary difficulty from entrapped air has been caused by that air which was entrapped so close to the inner core, that by the time it was driven from the surface on which it was adsorbed and started toward the surface of the hose, the outer layer was cured and solidified, and the bubble became trapped in the outer layer to form an unsightly flaw.

The height of the lands developed in this process depends principally upon the temperature in the curing chambers and the residence time therein. It has been found that a minimum of 350° F. is necessary for best results, and of course the upper temperature is restricted by the fire hazard involved. Generally speaking a residence time of 1½ minutes at a temperature between 350° and 375° F. gives optimum results.

It has been found that the process of pre-heating the hose in pre-heat chamber 70 results in substantially de-airing the surface of the inner core and the braid surrounding it. To prevent excessive stretching of the hose, it is undesirable to heat the hose any more than necessary, and therefore only a slight tread is formed on the outer surface of the inner core in the pre-heat chamber.

Heating methods other than infrared radiation may of course be utilized. However, the use of infrared radiation materially cuts down the curing time and accordingly permits the machines to be operated at a higher rate of speed.

It will be understood that with any of the embodiments shown herein, the source of the inner core may be an extruder disposed in line with the rest of the equipment, or may simply be a reel of previously-formed core. The source of braid-covered inner core may also be other than as shown. For example, instead of plaiting the braid onto the already-extruded inner core, another well-known process is to provide a "tube" of braid, and insert the inner core therein. The method or technique of obtaining the braid-covered inner core forms no part of this invention, and therefore any appropriate means may be utilized to provide such a braid-covered core for subsequent immersion in the plasticizer. An important consideration in the choice of braid-applying techniques resides in the fact that the braiding machines operate at a much slower rate than the extruders. Therefore a set-up most appropriate to a given factory's production rate will be selected.

The hose produced by the apparatus and process of this invention has many features which are superior to those attainable with smooth-contoured hoses. The treaded outer contour provides a number of lands which make the direct contact with the ground and protect the main body of the inner core from abrasion. They also provide a protection for the braid which could otherwise be obtained only by providing an outer layer of undesirably heavy thickness and rigidity. This braid is placed radially within the outer dimensions of the raised lands, and is additionally protected by the outer layer.

The mutually-bonded relationship of the inner core, braid, and outer layer, plus the lateral support given the braid by the raised lands, assure that when the hose is flexed, the braid cannot shift to cut the outer layer free from the inner core.

In addition, it has been found that by wetting the braid with plasticizer, the braid has a tendency to indent itself into the surface of the inner core, particularly when they are heated. This tendency for indentation is noticeable even when the inner core is not caused to swell. It will be understood that a similar result could be obtained by utilizing a braid material which will shrink onto the inner core and embed itself when wetted by the plasticizer. This indentation materially reduces the shifting tendencies of the braid.

This reinforced hose has a considerably greater strength than conventional, unreinforced hose, and the .700 inch hose described within has successfully withstood pressures in excess of 600 lbs. per square inch, and has not failed at 400 lbs. per square inch. Heavier-walled tubing has been made which has withstood air pressures of 3000 lbs. per square inch.

This hose, being impermeable to fluids, may be used for air and other gases as well as liquids. It is impervious to oils, acids, and alkalies, and therefore can be used as a flexible conduit for a wide range of fluids at high pressures.

It will be understood that this invention is useful in applying braids in hoses which may have more than two plies, the number of plies and the number of braid layers being no restriction on this invention. The same techniques of dipping the braid into plasticizer and of vacuum de-airing will be useful in all cases.

It will further be appreciated that the wetting of the braid with plasticizer can be accomplished by means other than dipping the braid-covered inner core into a tank. The plasticizer might for example, be applied to the braid core while it is being applied on the inner core, or even before that time. However, the simplest, and generally the most desirable, technique is to apply the plasticizer by means of dipping as shown in the drawings.

The term "braided" as used herein with respect to the braid reinforcement will also be understood to mean "woven" or any other type of intersecting pattern of reinforcing strands.

Other modifications of this process will suggest themselves to persons skilled in the art. Therefore this invention is not to be limited by the embodiments shown in the drawings and described in the description, which are given by way of example and not of limitation, but only in accordance with the scope of the appended claims.

I claim:
1. In an apparatus for applying an outer layer of a plastisol to an inner core of a plastic hose having a reinforcing braid thereon to form an integral multi-layer hose, the combination of: reservoir means for containing a quantity of the plastisol; an elongated, U-shaped, vertically disposed conduit positioned above said reservoir means with the ends of said conduit beneath the surface of the plastisol in said reservoir means; means for creating a vacuum coupled to the bight of said conduit; a wiper die for removing excess plastisol from said braid covered inner core; a source of heat for curing the plastisol on said braid covered core; and drive means for guiding the hose into said reservoir means, through said conduit and back through said reservoir means, through said wiper die, and then past said heat source for removing air and entrapped gases from said plastisol wetted hose in said conduit, removing excess plastisol in said wiper die, and curing the remaining plastisol in place on the braid reinforced hose, said drive means including a rotating pulley positioned at said bight of said conduit adjacent said coupling of said vacuum means.

2. An apparatus as defined in claim 1 including a second source of heat for heating the braid reinforced inner core, with said drive means guiding the hose past said second heat source immediately prior to entering said reservoir means for the first time.

3. An apparatus as defined in claim 1 in which said wiper die includes: converging wall means defining an inlet section; a throat section having a cross-sectional area slightly greater than that of the hose to be coated permitting passage of the hose therethrough, said throat section having a discontinuous wall; a reservoir section having a cross-sectional area greater than that of said throat section; and an orifice section having a cross-sectional area defining the size of the coated hose, said sections being in alignment for upward passage of the plastisol coated hose successively through said inlet, throat, reservoir, and orifice sections.

4. In a wiper die for uniformly coating a hose having an irregular contour surface, which hose has been passed through a liquid coating material, the combination of: converging wall means defining an inlet section; a throat section having a cross-sectional area slightly greater than that of the hose to be coated permitting passage of the hose therethrough, said throat section having a discontinuous wall; a reservoir section having a cross-sectional area greater than that of said throat section; and an orifice section having a cross-sectional area defining the size of the coated hose, said sections being in alignment for upward passage of the liquid coated hose successively through said inlet, throat, reservoir, and orifice sections.

5. A wiper die as defined in claim 4 in which said throat section has a plurality of slots in the wall thereof providing communication between said inlet section and said reservoir section for transportation of liquid coating material into said reservoir section by the moving hose.

References Cited in the file of this patent

UNITED STATES PATENTS

| | | |
|---|---|---|
| 1,154,447 | Sleeper | Sept. 21, 1915 |
| 1,668,563 | Johnston | May 8, 1928 |
| 1,698,886 | Johnston | Jan. 15, 1929 |
| 1,826,297 | Apple | Oct. 6, 1931 |
| 2,083,731 | Miller | June 15, 1937 |
| 2,386,818 | Seavey | Oct. 16, 1945 |
| 2,478,940 | Pape | Aug. 16, 1949 |
| 2,626,426 | Stahl | Jan. 7, 1953 |